(12) United States Patent
Gu et al.

(10) Patent No.: US 10,207,568 B2
(45) Date of Patent: Feb. 19, 2019

(54) HEATER FOR MOTOR VEHICLE

(71) Applicant: Halla Visteon Climate Control Corp., Daejeon (KR)

(72) Inventors: Jung Sam Gu, Daejeon (KR); Yong Sung Kwon, Daejeon (KR); Hyun Kun Shin, Daejeon (KR); Jun Young Song, Daejeon (KR); Kwan Hun Oh, Daejeon (KR); Hong-Young Lim, Daejeon (KR); Young-Ha Jeon, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 369 days.

(21) Appl. No.: 14/652,136

(22) PCT Filed: Jan. 28, 2014

(86) PCT No.: PCT/KR2014/000797
§ 371 (c)(1),
(2) Date: Jun. 15, 2015

(87) PCT Pub. No.: WO2014/119902
PCT Pub. Date: Aug. 7, 2014

(65) Prior Publication Data
US 2015/0343883 A1    Dec. 3, 2015

(30) Foreign Application Priority Data

Jan. 29, 2013 (KR) .................. 10-2013-0009565
Jul. 9, 2013 (KR) .................. 10-2013-0080601

(51) Int. Cl.
*B60H 1/22* (2006.01)
*H05B 3/26* (2006.01)
(Continued)

(52) U.S. Cl.
CPC ......... *B60H 1/2225* (2013.01); *F24H 3/0429* (2013.01); *F24H 3/0435* (2013.01);
(Continued)

(58) Field of Classification Search
CPC ..... B60H 1/2225; B60H 1/034; F24H 3/0429; F24H 3/062; F24H 3/0435; F24H 3/0441;
(Continued)

(56) References Cited

U.S. PATENT DOCUMENTS 7,816,630 B2    10/2010 Hamburger et al.
2003/0015520 A1    1/2003 Jiang
(Continued)

FOREIGN PATENT DOCUMENTS

CN    101132658 A    2/2008
DE    102008033143 A1    2/2010
(Continued)

OTHER PUBLICATIONS

Aoki, Akira, JP2007309533A, Fin Tube Heat Exchanger, Nov. 29, 2007, Espacenet translation, Description.*

*Primary Examiner* — Tu B Hoang
*Assistant Examiner* — Masahiko Muranami
(74) *Attorney, Agent, or Firm* — Shumaker, Loop & Kendrick, LLP; James D. Miller (57) ABSTRACT

Provided is a heater for a motor vehicle including: a heat source part: a heat source part rod including a rod sidewall and a rod cover in order to receive the heat source part; a first heat radiating plate including a first heat generation region in which one side of the heat source part is disposed and a first air movement region in which at least one or more first through-holes are formed; and a second heat radiating plate including a second heat generation region in which the other side of the heat source part is disposed and a second air movement region in which at least one or more second
(Continued)

through-holes are formed. Particularly, the heat source part is disposed between the first and second heat radiating plates, and the rod sidewall is provided integrally with the first heat radiating plate.

5 Claims, 10 Drawing Sheets

(51) Int. Cl.
  *H05B 3/24* (2006.01)
  *H05B 3/42* (2006.01)
  *F24H 3/04* (2006.01)
  *F24H 9/18* (2006.01)

(52) U.S. Cl.
  CPC ......... *F24H 3/0464* (2013.01); *F24H 9/1872* (2013.01); *H05B 3/24* (2013.01); *H05B 3/26* (2013.01); *H05B 3/42* (2013.01); *F24D 2200/08* (2013.01); *H05B 2203/02* (2013.01); *H05B 2203/023* (2013.01)

(58) Field of Classification Search
  CPC ... H05B 3/24; H05B 3/50; H05B 3/20; H05B 3/30
  USPC ............... 392/347, 394, 386, 360, 379, 365; 219/503, 505, 540, 530, 546, 202, 541
  See application file for complete search history.

(56) References Cited

U.S. PATENT DOCUMENTS

| | | | | |
|---|---|---|---|---|
| 2005/0205552 | A1* | 9/2005 | Han | F24H 3/0405 219/540 |
| 2007/0018777 | A1* | 1/2007 | Seock | H05B 3/06 338/22 R |
| 2009/0139983 | A1* | 6/2009 | Luppold | B60H 1/2225 219/530 |
| 2010/0122978 | A1* | 5/2010 | Oh | H05B 3/50 219/540 |
| 2010/0140253 | A1* | 6/2010 | Man Ju | H05B 3/50 219/505 |
| 2011/0240631 | A1 | 10/2011 | Luppold et al. | |
| 2012/0261403 | A1* | 10/2012 | Luppold | H05B 3/50 219/520 |

FOREIGN PATENT DOCUMENTS

| | | | | |
|---|---|---|---|---|
| EP | 2063683 | A1 | 5/2009 | |
| EP | 2292455 | A1 | 3/2011 | |
| JP | 2007278609 | A | 10/2007 | |
| JP | 2007309533 | * | 11/2007 | ............... F25B 1/00 |
| KR | 10-0537748 | B1 | 12/2005 | |
| KR | 20-0416894 | | 5/2006 | |
| KR | 1020060119163 | A | 11/2006 | |
| KR | 1020100055262 | A | 5/2010 | |
| KR | 1020110060274 | A | 6/2011 | |
| KR | 1020120032795 | A | 4/2012 | |
| WO | 2008030064 | A1 | 3/2008 | |

\* cited by examiner

FIG. 1

PRIOR ART

HEATER FOR MOTOR VEHICLE

CROSS-REFERENCE TO RELATED APPLICATIONS

This application is a United States national phase application based on PCT/KR2014/000797 filed Jan. 28, 2014, which claims the benefit of Korean Patent Application No. 10-2013-0009565 filed Jan. 29, 2013 and 10-2013-0080601 filed Jul. 9, 2013.

TECHNICAL FIELD

The present invention relates to a heater for a motor vehicle, and more particularly, to a heater for a motor vehicle capable of facilitating mechanical coupling and improving heat generation performance by disposing a heat source part formed of a positive temperature coefficient (PTC) device in a heat generating region between heat radiating plates disposed in a direction perpendicular to an air flow direction and spaced apart from each other by a predetermined distance and extrusion-molding at least any one of a rod sidewall and a rod cover integrally with at least any one of the heat radiating plates.

BACKGROUND ART

A hot water heater used in order to heat an interior of a motor vehicle circulates a heat exchanging medium (coolant) heated while passing through an engine to a heater core to heat introduced air. However, at the time of initial start-up of the motor vehicle, a significant time is required until the heat exchanging medium is heated.

As a method for complementing this, an electric heater or an electrical heater has been recently used. As an example, a positive temperature coefficient (PTC) heater electrically directly heating introduced air has been used as an auxiliary heating means together with or independently of the hot water heater. An example of Patent Documents which relates to the PTC heater includes Korean Patent Laid-Open Publication No. 2010-0055262, Korean Patent No. 1163448, and Korean Patent Laid-Open Publication No. 2006-0119163 filed by the present applicant, and the like.

Figure 1:
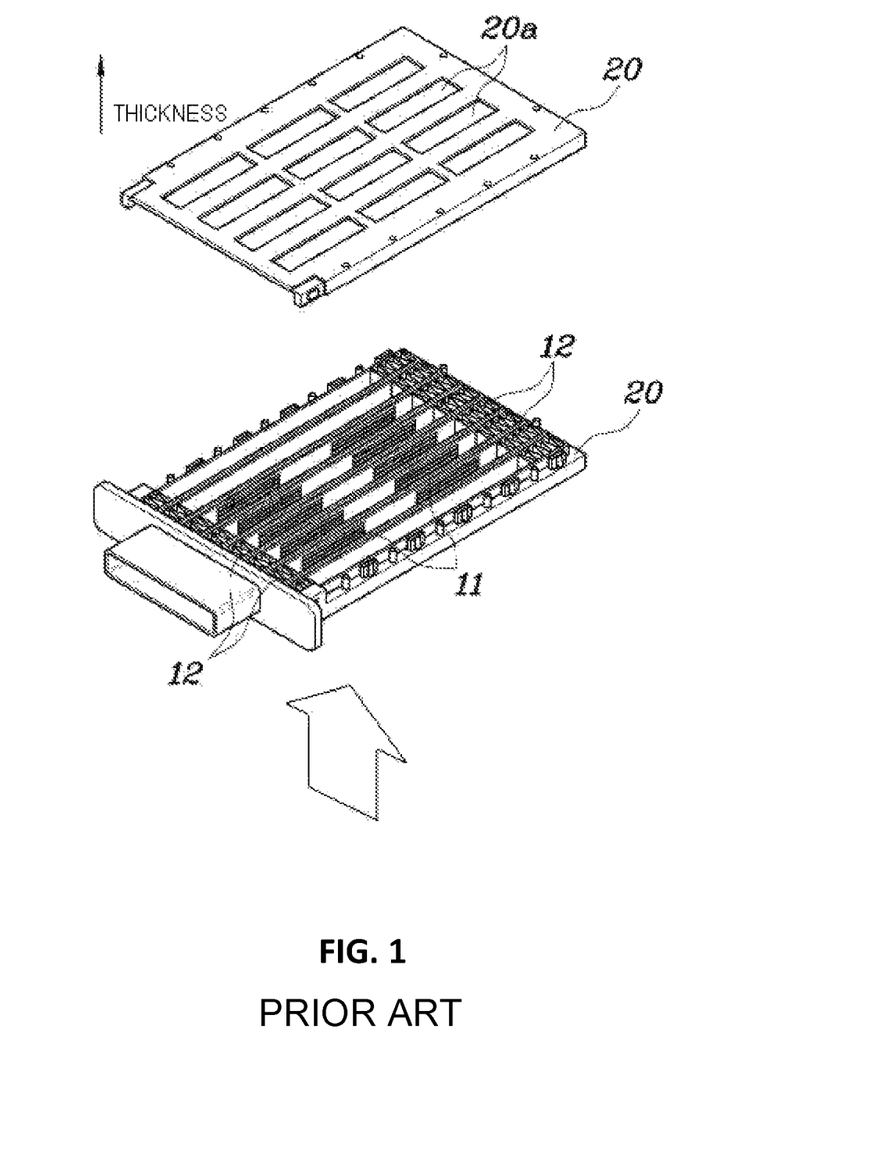
FIG. 1 is a partially exploded perspective view of a positive temperature coefficient (PTC) heater according to the related art.

Referring to FIG. 1, which is the related art, an air flow direction is denoted by an arrow, a rod assembly in which PTC devices 11 are assembled and a plurality of heat radiating fins 12 coupled to the rod assembly to radiate heat are coupled to each other by an adhesive means, and a housing 20 for enclosing and protecting the heat radiating fins 12 is further included. Generally, the heat radiating fins of FIG. 1 are called corrugated fins and have an advantage that a heat radiating area is increased due to a zigzag shape, but have disadvantages that manufacturing and assembling processes are complicated and a volume and a weight are large.

Further, in the related art, a heat source part including the PTC device is disposed in a direction that is in parallel with the air flow direction, such that an area of the heat source part has a direct effect on heat generation performance. Therefore, there was a limitation in decreasing a thickness (air flow direction) of a PTC heater.

Meanwhile, the PTC device according to the related art is generally received in a separate rod assembly for receiving the PTC device and is coupled to other heat radiating means by an adhesive, or the like. However, in the case in which the heat radiating means and the rod assembly are not closely adhered to each other due to a clearance or an air gap generated therebetween, heat exchange efficiency is decreased. In addition, a deviation may occur in heat radiating performance depending on an amount of applied adhesive means.

Further, at the time of repetition of thermal load, a phenomenon that adhesion is decreased occurs, such that durability is decreased, and performance deterioration and a defective product may be caused after an operation for a predetermined time.

In addition, in the case in which heat radiating performance is deteriorated, an electrical problem may occur, such that a plurality of heat radiating fins should be coupled by the adhesive means. Therefore, a work environment is not good, an assembling process is troublesome, and the number of components, a weight, and a cost are increased.

Technical Problem

An object of the present invention is to provide a heater for a motor vehicle capable of being easily assembled due to a simple configuration, decreasing the number of components, and using an adhesive means as small as possible. Another object of the present invention is to provide a heater for a motor vehicle capable of maintaining close adhesion between components even at the time of repetition of thermal load and improving heat exchange performance and durability by preventing movement of the components.

Technical Solution

In one general aspect, a heater for a motor vehicle includes: a heat source part: a heat source part rod including a rod sidewall and a rod cover in order to receive the heat source part; and a first heat radiating plate including a first heat generation region and a first air movement region in which at least one or more first through-holes are formed, wherein the heat source part is disposed on one side of the first heat radiating plate, and the rod sidewall is provided integrally with the first heat radiating plate. The rod sidewall may be extrusion-molded integrally with the first heat radiating plate.

The heater for a motor vehicle may further include a second heat radiating plate including a second heat generation region and a second air movement region in which at least one or more second through-holes are formed, wherein the heat source part is disposed between the first heat radiating plate and the second heat radiating plate.

The heat source part may include a positive temperature coefficient (PTC) device, an electrode plate electrically contacting the PTC device, and an insulating guide member insulating the PTC device and the electrode plate from the rod sidewall.

An upper surface of the insulating guide member may be provided with at least one or more opening parts in which the PTC device is seated, and a lower surface of the insulating guide member may be provided with protrusion parts so that an electrode plate receiving part in which the electrode plate is seated is formed. The heater for a motor vehicle may further include an insulating layer interposed between the electrode plate and the first heat radiating plate.

An upper surface of the insulating guide member may be provided with at least one or more opening parts in which the PTC device is seated, and a side of the insulating guide member is provided with a slit shaped electrode plate receiver 166' into which the electrode plate is slid and inserted and an insulating part.

In a preferable first embodiment, the rod cover may include a first rod cover provided with step parts, and the rod sidewall may be a first rod sidewall including a pair of first sidewalls spaced apart from each other by a predetermined distance, first catching jaws formed at upper end portions of the first sidewalls, respectively, and seated on the step parts of the first rod cover, respectively, and first modified parts extended from the first catching jaws, respectively, and pressed to upper surfaces of the step parts, respectively, to thereby be bent and coupled to the upper surfaces of the step parts, respectively. The first rod cover and the second heat radiating plate may be coupled to each other by an adhesive means.

In a preferable second embodiment, the second heat radiating plate may be provided with a plurality of fastening grooves, and the rod sidewall may be a second rod sidewall including a pair of second sidewalls spaced apart from each other by a predetermined distance and at least one or more second modified parts extended so as to penetrate through the fastening grooves, respectively, and pressed to an upper surface of the second heat radiating plate to thereby be bent or caulking-coupled to the upper surface of the second heat radiating plate.

The second rod sidewall may further include second catching grooves formed at upper end portions of the second sidewalls, respectively, and allowing the second heat radiating plate to be seated thereon in the state in which the second heat radiating plate is spaced apart from the first heat radiating plate by a predetermined distance.

In a preferable third embodiment, the rod cover may be a separate rod cover provided with step parts, and the rod sidewall may be a third rod sidewall including a pair of third sidewalls spaced apart from each other by a predetermined distance and first guide grooves formed in inner surfaces of third sidewalls, respectively, and having the step parts of the separable rod cover slid and inserted thereinto, respectively. The separable rod cover and the second heat radiating plate may be coupled to each other by an adhesive means.

The second heat radiating plate may have a concave recessed seating groove formed in the second heat radiation generation region thereof so that the separable rod cover is seated thereon.

In a preferable fourth embodiment, the rod sidewall may be a fourth rod sidewall including a pair of fourth sidewalls spaced apart from each other by a predetermined distance and second guide tabs bent inward from upper ends of the fourth sidewalls, respectively, and the rod cover may be an integral rod cover in which a cover body protruding in a direction in which the second heating plate contacts the heat source part includes third guide grooves formed at both end portions of the second heat radiating plate and the cover body, respectively, and slid and coupled into the second guide tabs of the fourth rod sidewall, respectively, the integral rod cover RC2 being provided with integrally with the second heat radiating plate. The fourth rod sidewall may further include second guide groove formed in inner surfaces of the fourth sidewalls, respectively.

Advantageous Effects

With a heat exchanger according to the present invention, a thickness may be decreased by a simple structure, thereby making it possible to provide compact packaging. In addition, since the first and second heat radiating plates themselves perform a heat radiating function, they may be very easily manufactured and assembled as compared with heat radiating fins that were used according to the related art.

Further, the through-holes formed in the first and second heat radiating plates may have an action and an effect of the heat radiating fins and may be manufactured in various shapes and patterns, such that applicability as an optimized heater for a motor vehicle is excellent.

In addition, one surface or both surfaces of the heat source part rod between the first and second heat radiating plates is mechanically coupled, such that the use of an adhesive means may be minimized, thereby making it possible to improve durability even at the time of repetition of thermal load and minimize generation of a deviation in performance due to non-uniformity of an amount of applied adhesive means.

Particularly, the rod sidewall is extrusion-molded integrally with the first heat radiating plate, thereby making it possible to decrease the number of components and improve close adhesion between the components, or the like. Further, in the case in which the rod cover is extrusion-molded together with the second heat radiating plate, the adhesive means do not need to be used, such that the above-mentioned problems may be solved at a time.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

1: Heater for motor vehicle
10, 10': Heat source part
120: PTC device
140: Electrode plate
160, 160': Insulating guide member
180: Insulating layer
30: First heat radiating plate
320: First plate
340: First through-hole
50: Second heat radiating plate
520: Second plate
540: Second through-hole
560: Seating groove
70: Adhesive means
90: Housing
R: Heat source part rod (RS: Rod sidewall
RC: Rod cover)
RS1: First rod sidewall
RS2: Second rod sidewall
RS3: Third rod sidewall
RS4: Fourth rod sidewall
RC1: Separable rod cover
RC2: Integral rod cover

BEST MODE

Hereinafter, the present invention will be described in more detail with reference to the accompanying drawings.

FIGS. 2 to 6 are drawings showing a first exemplary embodiment according to the present invention. Referring to an exploded perspective view of FIG. 2 and an assembled perspective view of FIG. 3, a heater for a motor vehicle according to the present invention includes first and second heat radiating plates 30 and 50 disposed in a direction (X-axis direction of FIG. 2) perpendicular to an air flow direction (Z-axis direction of FIG. 2) and a heat source part 10 disposed between the first and second heat radiating plates 30 and 50.

Figure 2:
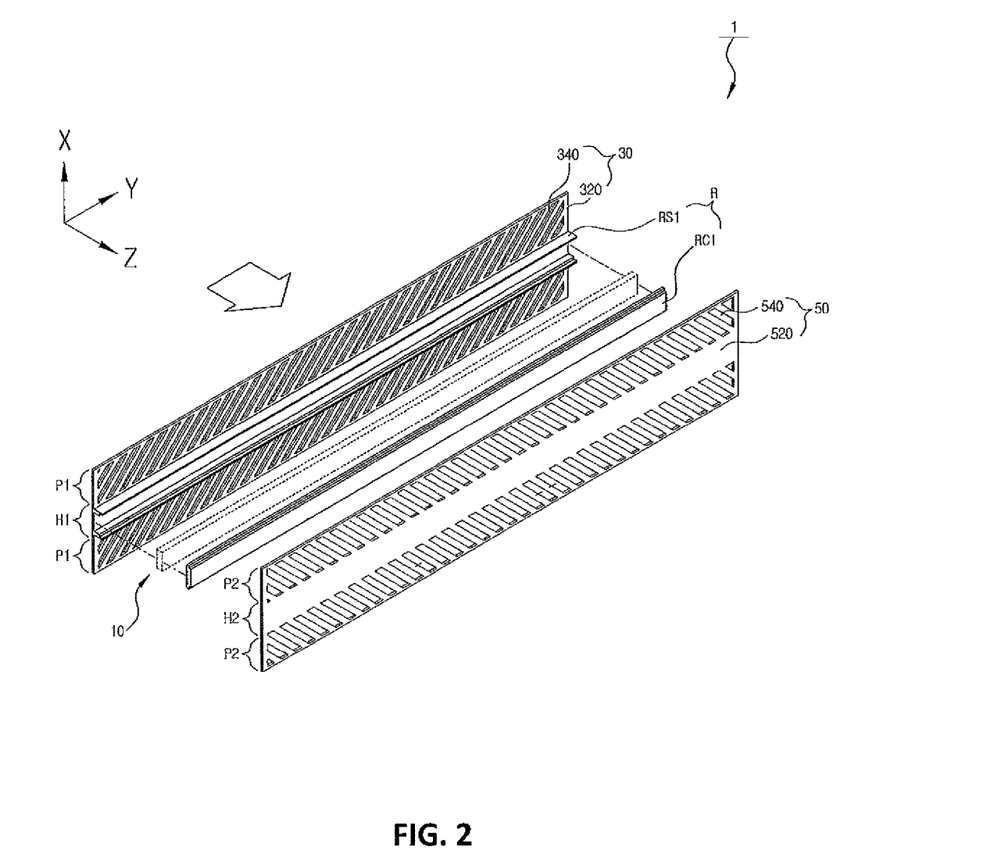
FIG. 2 is an exploded perspective view showing a first exemplary embodiment according to the present invention.

Here, a heat source part rod R including a rod sidewall RS and a rod cover RC in order to receive the heat source part 10 is provided (in FIG. 2, a first rod sidewall RS1 and a separable rod cover RC1 are shown as a specific example). Particularly, the rod sidewall RS is characterized in that it is extrusion-molded integrally with the first heat radiating plate 30. Further, the rod cover RC as well as the rod sidewall RS may be extrusion-molded integrally with the first heat radiating plate 30 and/or the second heat radiating plate 50.

Referring to FIG. 2, in the heater for a motor vehicle according to the present invention installed and used in the motor vehicle, generally, air is introduced from the front of the motor vehicle (Z axis direction), passes through the heater for a motor vehicle, and is then discharged, such that heat exchange is made. The first and second heat radiating plates 30 and 50 configuring the present invention are disposed in the Z axis direction in FIG. 2.

Here, although the case in which the first heat radiating plate 30 is disposed in front of the second heat radiating plate 50 in a direction in which the air is introduced has been shown in FIG. 2, sequences of the first and second heat radiating plates may be exchanged. In the present specification, for convenience of explanation, a heat radiating plate shown at a lower side in FIGS. 5 to 10 and FIGS. 12 to 14 and having the heat source part 10 seated thereon will be defined as a first heat radiating plate 30, and a heat radiating plate facing the first heat radiating plate 30 will be defined as a second heat radiating plate 50.

In FIG. 2, the heat source part 10 configuring the present invention is denoted by a dotted line. The heat source part 10 may be first assembled by a separate rod assembly (not shown) and be then coupled to the first and second heat radiating plates 30 and 50 by an adhesive means, respectively.

However, in the present invention, in the heat source part rod R for receiving the heat source part 10, at least any one or more surfaces forming the heat source part rod R may be formed integrally with the first heat radiating plate 30 in advance. Here, at least any one or more surfaces may be the rod sidewall RS and/or the rod cover RC forming the heat source part rod R. Preferably, the first heat radiating plate 30 and the heat source part rod R are manufactured integrally with each other by an extrusion-molding manufacturing method using a material having excellent thermal conductivity, thereby minimizing the use of an adhesive means to be described below.

Referring to FIG. 2, as an example of the rod sidewall RS configuring the heat source part rod R, it is shown that a pair of first rod sidewalls RS1 are extrusion-molded integrally with the first heat radiating plate 30. The heat source part 10 may be seated in a predetermined space formed between the pair of first rod sidewalls RS1, and the separable rod cover RC1 may close an opening formed by the first heat radiating plate 30 and the first rod sidewall RS1 to receive the heat source part 10. Therefore, a provisional assembly by the first heat radiating plate 30 with which the first rod sidewall RS1 is formed integrally, the heat source part 10, and the separable rod cover RC1 is completed. Here, an inner side of a first heat generation region H1 of the first heat radiating plate 30 functions as a kind of rod cover RC, thereby making it possible to decrease the number of components and assembling processes and improve heat radiating efficiency.

Referring to FIG. 2, the first heat radiating plate 30 includes at least one or more first through-holes 340 formed in a predetermined region of a first plate 320. The first heat radiating plate 30 includes a first air movement region P1 and a first heat generation region H1. The first heat generation region H1 indicates a region of an inner surface on which the heat source part 10 is seated and an outer surface, and the first air movement region P1 indicates a region except for the first air movement region P1 in the first heat radiating plate 30.

After the first heat radiating plate 30 with which the first rod sidewall RS is extrusion-molded integrally is manufactured, the at least one or more first through-holes 340 may be formed in the first heat radiating plate 30 by a punching press apparatus, or the like. More preferably, the first through-hole 340 may have a louver fin (not shown) added thereto in order to improve air introduction force.

In FIG. 2, an air through-hole having a slit shape in an oblique line direction is shown as a preferable example of the first through-hole 340. However, the present invention is not limited thereto. That is, shapes, the number, disposition, and patterns of the first through-holes 340 may be variously changed for optimal air heat exchange. As an example, the first through-hole 340 may also have a rectangular shape (not shown).

An inner side of the first heat radiating plate 30 facing an air flow direction is provided with an inner surface of the first heat generation region H1 on which the heat source part 10 is to be seated. Although the case in which the heat source part 10 is disposed at the center of the first heat radiating plate 30 in the Z axis direction has been shown as a preferable example in FIG. 2, the present invention is not limited thereto. In addition, although the case in which the first heat radiating plate 30 has a rectangular cross section when viewed in the Z axis direction has been shown, the first heat radiating plate 30 may also have a square cross section, a polygonal cross section, or a shape in which other subordinate members are coupled thereto.

Further, although the state in which one heat source part 10 received in one heat source part rod R is assembled to the first heat radiating plate 30 has been shown in FIG. 2, a plurality of heat source part rods R and heat source parts 10 that may be received in the plurality of heat source part rods R, respectively, may also be seated on the first heat radiating plate 30.

Meanwhile, the second heat radiating plate 50 spaced apart from the first heat radiating plate 30 by a predetermined distance and facing the first heat radiating plate 30 with the heat source part 10 disposed therebetween. The second heat radiating plate 50 includes at least one or more second through holes 540 formed in a predetermined region of a second plate 520, and also includes a second heat generation region H2 and a second air movement region P2 in which the at least one or more second through-holes 540 are formed.

Referring to FIG. 2, the second through-hole 540, which is an air through-hole having a slit shape, is disposed so as to intersect with the oblique line direction of the first through-hole to generate air turbulence in a space between the first and second heat radiating plates 30 and 50, thereby making it possible to allow air to be sufficiently heated. However, shapes, the number, disposition, and patterns of second through-holes 540 are not limited thereto. That is, the first through-hole or the second through-hole may be variously applied such as a rectangular hollow part, or the like.

A description of contents overlapped with those of the first heat generation region H1 and the first through-hole 340 of the first heat radiating plate 30 among contents of the second heat generation region H2 and the second through-hole 540 of the second heat radiating plate 50 will be omitted since they are substantially the same as each other.

Figure 3:
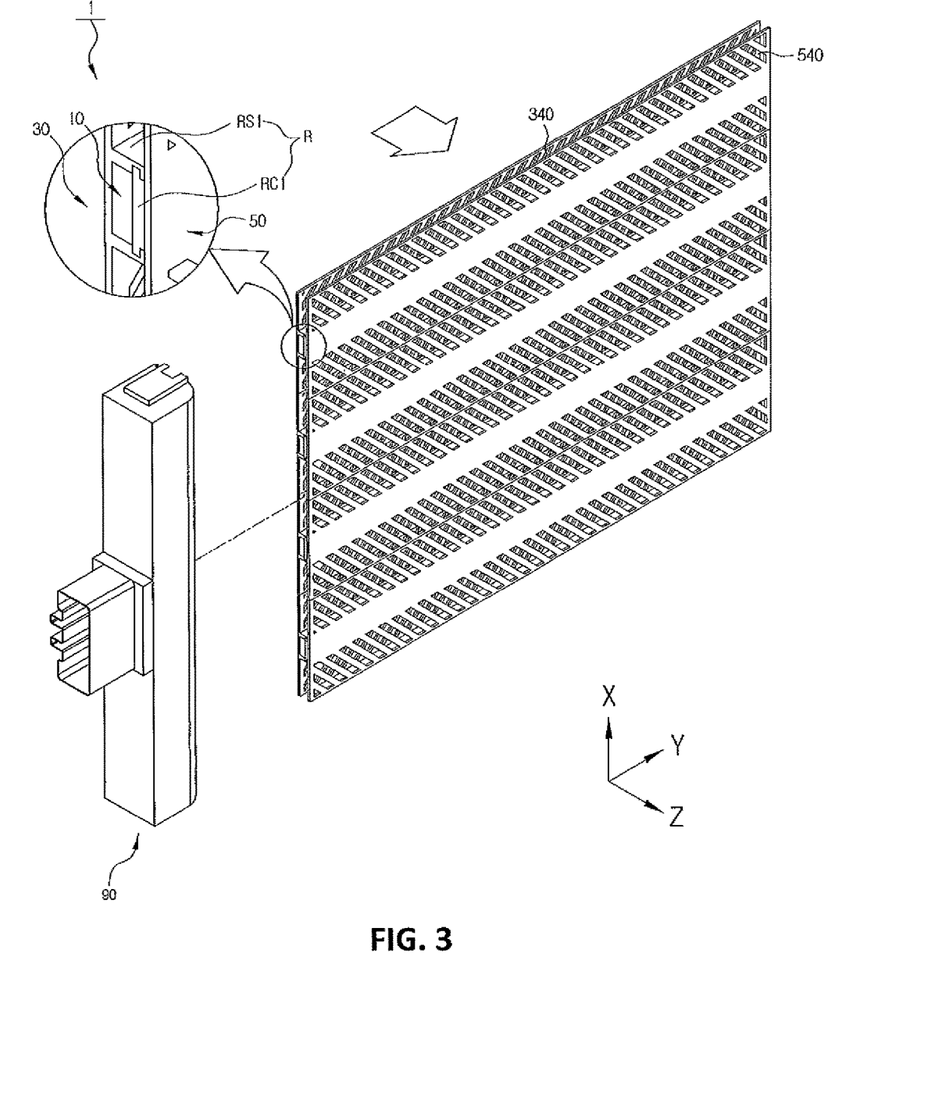
FIG. 3 is an assembled partially exploded perspective view showing a state in which a plurality of first exemplary embodiments according to the present invention are assembled to each other.

FIG. 3 shows an example in which a plurality of heaters for a motor vehicle including the first heat radiating plate 30, the heat source part 10, the heat source part rod R, and the second heat radiating plate 50 according to a first exemplary embodiment of the present invention are stacked in the X axis direction. Referring to a partially enlarged view of a dotted circle of FIG. 3, a state in which the pair of first rod sidewalls RS1 are extrusion-molded integrally with the first heat radiating plate 30 are extended and a front end portion thereof is bent (or folded) at a step portion of the separable rod cover RC1, and an outer surface of the separable rod cover RC1 is coupled to the second heat radiating plate 50 by an adhesive means, or the like, is shown. (A detailed assembling process will be described below.)

Preferably, the heater for a motor vehicle may further include a housing 90 disposed at one side thereof in order to transfer and supply electricity to an electrode plate or fix a plurality of first heat radiating plates and second heat radiating plates. The housing 90 may have a shape in which it is easily inserted into a HVAC of the motor vehicle and has a closure feature.

Figure 4:
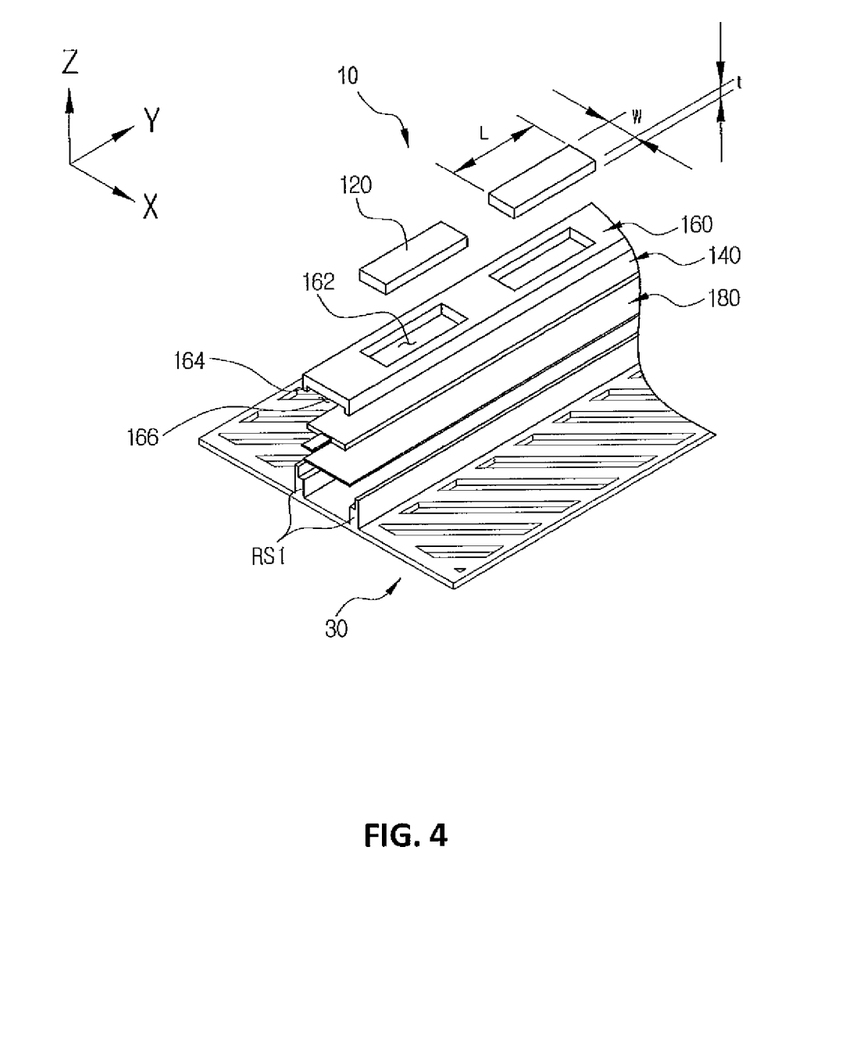
FIG. 4 is a partially exploded fragmentary perspective view showing an example of a heat source part configuring a first exemplary embodiment according to the present invention.

FIG. 4 is an exploded perspective view showing an example of the heat source part 10 configuring the present invention. The heat source part 10, which electrically generates heat, may include various electrical devices that are applicable to the present invention. Preferably, a heat generation device such as a positive temperature coefficient (PTC) heater or a carbon nano tube (CNT) may be used.

Referring to FIG. 4, the heat source part 10 configuring the present invention may include a PTC device 120, an electrode plate 140 electrically contacting the PTC device, and an insulating guide member 160 insulating the PTC device and the electrode plate from the rod sidewall RS.

Preferably, an insulating layer 180, the electrode plate 140, and the insulating guide member 160 are sequentially stacked in a predetermined space formed between the pair of first rod sidewalls RS of the first heat radiating plate 30 and the PTC device 120 is then seated in at least one or more opening parts 162 formed in the insulating guide member 160, thereby making it possible to provisionally assemble the heat source part 10.

Unlike a form shown in FIG. 4, components configuring the heat source part 10 may also be inversely stacked. For example, the insulating guide member 160 in which the PTC device 120 is seated is disposed in the space formed between the pair of first rod sidewalls RS1 of the first heat radiating plate 30, and the electrode plate 140 and the insulating layer 180 are sequentially stacked thereon and are then closed by the separable rod cover RC1, thereby making it possible to provisionally assemble the heat source part 10.

Meanwhile, in a cross-sectional shape of the insulating guide member 160, as shown in FIG. 4, protrusion parts 164 are formed at both sides of the insulating guide member 160, such that an electrode plate receiving part 166 in which the electrode plate 140 may be disposed may be formed between the protrusion parts 164. The insulating guide member 160 and the insulating layer 180 may have various shapes in which they are made of a non-conductive material through which electricity is not conducted, thereby preventing an electrical short-circuit due to the electrode plate 140.

The insulating guide member 160 and the insulating layer 180 prevent a short-circuit generated in the case in which the electrode plate 140 serving as an anode terminal and the heat source part rod R serving as a cathode terminal electrically contact each other. In addition, it is preferable that the insulating guide member 160 and the insulating layer 180 are made of a material having strong heat resistance and excellent thermal conductivity. In an exemplary embodiment of the present invention, the insulating guide member 160 is manufactured using a synthetic resin such as plastic and serves to prevent the short-circuit and provide easiness of insertion of the PTC device 120 at the time of fixing and assembling the PTC device 120.

Figure 5:
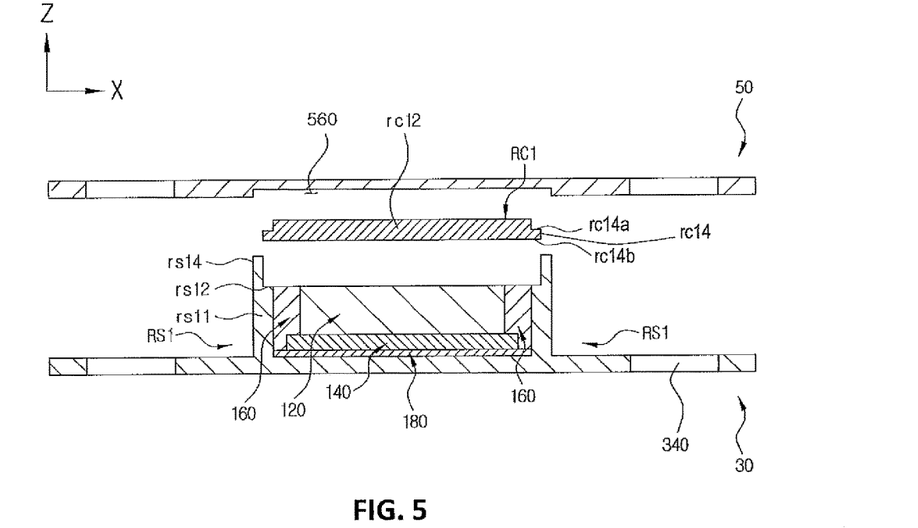
FIG. 5 is a cross-sectional view showing a state of a first exemplary embodiment according to the present invention before being coupled.

Here, the insulating layer 180 has a width larger than that of the electrode plate 140 as shown in FIG. 5 to be described below and the electrode plate 140 has a width larger than that of the PTC device 120, thereby making it possible to improve an insulating feature and an assembling feature.

Meanwhile, although the case in which heat is generated in the PTC device 120 using one electrode plate 140 has been shown in FIG. 4, a heat source part 10 including an anode plate and a cathode plate as electrode plates and including insulating guide members depending on the anode plate and the cathode plate may be used as long as it may generate heat in the PTC device 120 to implement an action and an effect of the present invention.

In FIG. 4, the usually used PTC device 120 is shown as a rectangular parallelepiped shape. For reference, length(L) *width(W)*thickness(t) of the usually used PTC device adopted in order to implement the present invention is 30*10*1 mm. Therefore, the widest area (L*W) contacts the electrode plate 140, the second heat radiating plate 50, the rod cover RC, or the like, thereby making it possible to maximize a heat transfer.

In addition, the thinnest thickness t is put on a Z axis, which is the air flow direction, to minimize a spaced distance between the first and second heat radiating plates 30 and 50, thereby making it possible to provide a thin film type heater for a motor vehicle of which a thickness is decreased as compared with a PTC heater according to the related art by a half or more.

That is, in the present invention, a direction in which the first heat radiating plate 30, the heat source part 10, and the second heat radiating plate 50 are coupled to each other is the same (axial direction) as a direction in which the PTC device 120 and the electrode plate 140 are stacked.

Figure 15:
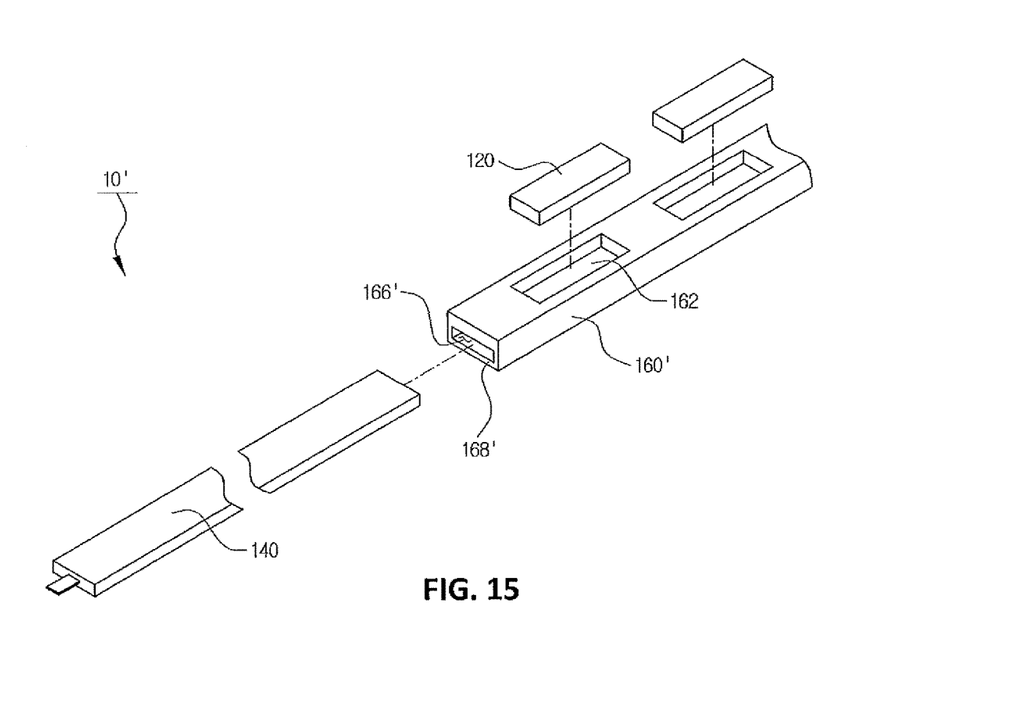
FIG. 15 is an assembled partially exploded fragmentary perspective view showing another example of a heat source part configuring the present invention.

Meanwhile, although the insulating layer 180 has been used in a shape of the insulating guide member 160 described with reference to FIG. 4 in order to prevent a directly electrical contact between the electrode plate 140 and the first radiating plate 30, when a shape of the insulating guide member 160 is designed so that a slit shaped electrode plate receiver 166' is formed as shown in FIG. 15 to be described below, the insulating layer 180 as shown in FIG. 4 may be omitted according to exemplary embodiments, which will fall within the scope of the present invention.

Figure 6:
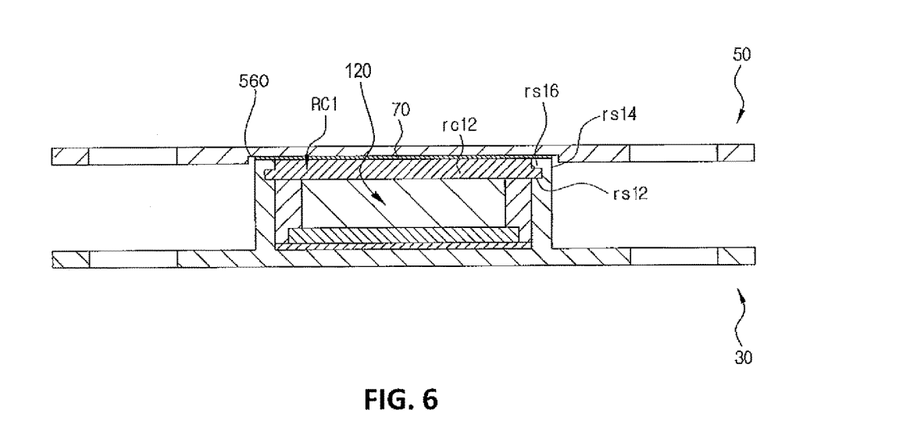
FIG. 6 is a cross-sectional view showing a state after being coupled in FIG. 5.

FIG. 5 is a cross-sectional view showing a state of a first exemplary embodiment according to the present invention before being coupled, and FIG. 6 is a cross-sectional view showing a state after being coupled in FIG. 5.

Referring to FIG. 5, an assembling process of a first exemplary embodiment in which the first rod sidewall RS1, which is an example of the rod sidewall RS, is extrusion-molded integrally with the first heat radiating plate 30 and the separable rod cover RC1, which is an example of the rod cover RC, is seated on an upper end of the first rod sidewall RS1 is shown.

More specifically, the separable rod cover RC1 may include a rod cover body rc12 and step parts rc14 formed at both end portions of the rod cover body, respectively.

In correspondence with this, the first rod sidewall RS1 may include a pair of first sidewalls rs11 spaced apart from each other by a predetermined distance in an X axis direction of FIG. 5, first catching jaws rs12, and first extension tabs rs14. The pair of first sidewalls rs11 are extended from the first heat radiating plate 30, respectively, with a predetermined space disposed therebetween, wherein the predetermined space has the heat source part 10 seated thereon.

An inner side of an upper end portion of the first sidewall rs11 toward the heat source part 10 may be provided with the first catching jaw rs12 on which a lower surface rc14b of the step part rc14 of the separable rod cover RC1 may be seated. In addition, in the case in which predetermined pressure is applied to a predetermined portion of the first extension tab rs14 extended from the first catching jaw rs12 in the assembling process, the predetermined portion of the extension tab rc14 is bent as a first modified part rs16.

Referring to FIG. 6, the predetermined portion of the extension tab rs14 may be pressed and bent to an upper surface rc14a of the step part rc14 of the separable rod cover RC1 by to thereby be coupled to the upper surface rc14a of the step part rc14 while a shape thereof is modified into the first modified part rs16. In addition, although the first extension tab rs14 may be provided throughout the first sidewall rs11 integrally with the first sidewall rs11 at the time of extrusion-molding, it may also be partially provided on the first sidewall rs11, which falls within the scope of the present invention.

It is preferable that when the first modified part rs16 is formed by pressing the first extension tab rs14, the PTC device 120 and a lower surface of the rod cover body rc12 are closely adhered to each other without an air gap and appropriate force is applied to the first extension tab rs14 in a range in which there is no risk of damage to the first extension tab rs14 due to physical force by the pressing.

Further, an adhesive means 70 is further added to surfaces of the rod cover body rc12 and/or the first modified part rs16 contacting the second heat radiating plate 50, such that the rod cover body rc12 and/or the first modified part rs16 may be coupled to the second heat radiating plate 50. More preferably, the adhesive means may be a heat resistant silicon, but is not limited thereto. That is, various thermal conductive adhesives that are applicable to the present invention may be used as the adhesive means.

Here, the second heat radiating plate 50 and the separable rod cover RC1 are closely adhered firmly to each other and the separate rod cover RC1 and the PTC device 120 are closely adhered firmly to each other, thereby making it possible to improve heat exchange efficiency.

As shown in FIG. 5, the second heat radiating plate 50 has a concave recessed seating groove 560 formed in the second heat generation region H2 thereof so that the separable rod cover RC1 is seated thereon, such that an entire length of the heater 1 for a motor vehicle in a width direction may be further decreased by a length of the concave recessed seating groove 560 in the width direction.

In addition, the rod sidewall RS configuring the heat source part rod R is extrusion-molded integrally with the first heat radiating plate 30, such that the first heat radiating plate 30 and the heat source part 10 may be assembled to each other without using an adhesive means. Preferably, the heat radiating plates 30 and 50 may be made of an aluminum alloy, or the like, but are not limited to being made of this material. That is, the heat radiating plates 30 and 50 may be made of a material that is applicable to the present invention, may be extrusion-molded, and has excellent thermal conductivity.

Further, in the related art, a separate heat source part rod R having a tube shape should be provided in order to receive the heat source part 10. However, in the present invention, one surface of the rod cover RC is replaced by the first heat generation region H1 of the first heat radiating plate 30, such that an adhesive means is not required and an additional effect such as a weight decrease is accomplished.

Meanwhile, although not shown in the accompanying drawings, an end portion of the heat source part rod R in a Y axis direction may further include a sealing part (not shown) for fixing the heat source part rod R and preventing induction of foreign materials.

Figure 7:
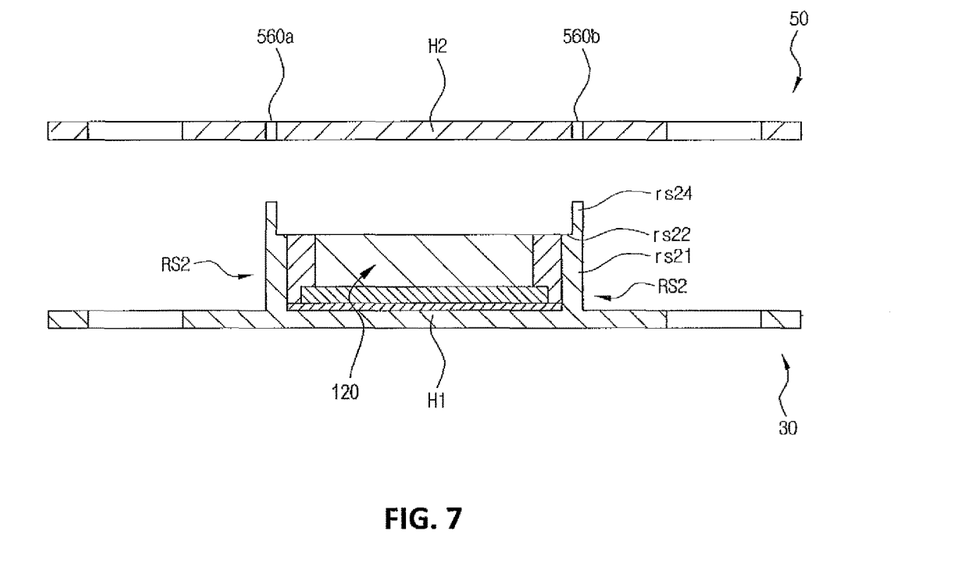
FIG. 7 is a cross-sectional view showing a state of a second exemplary embodiment according to the present invention before being coupled.
Figure 8:
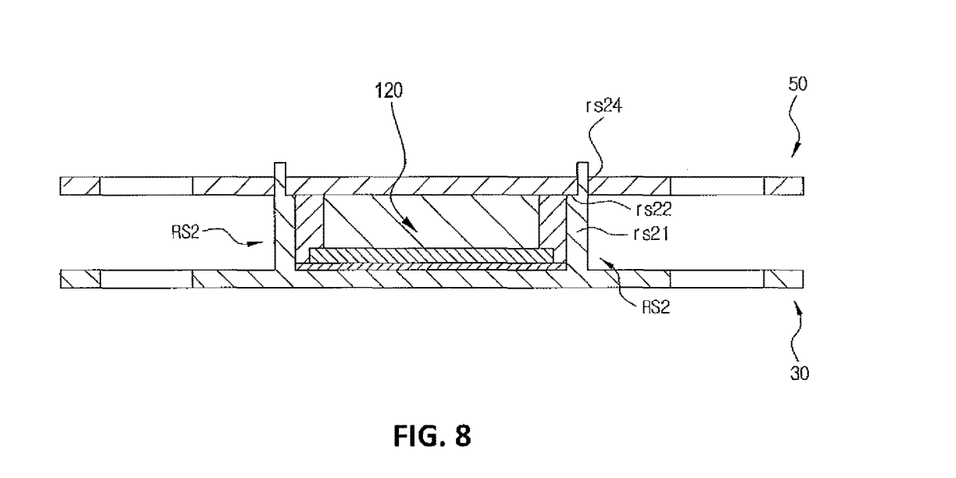
FIG. 8 is a cross-sectional view showing a partial state in a coupling process in FIG. 7.
Figure 9:
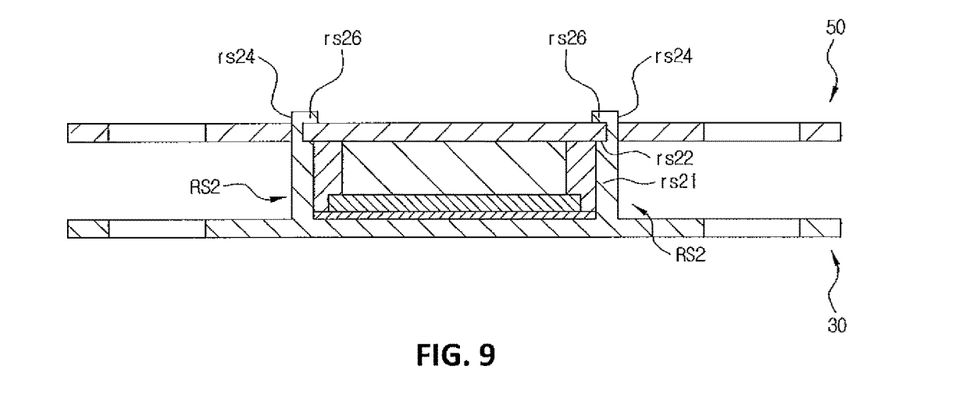
FIG. 9 is a cross-sectional view showing a state after being coupled by pressing and bending in FIG. 8.
Figure 10:
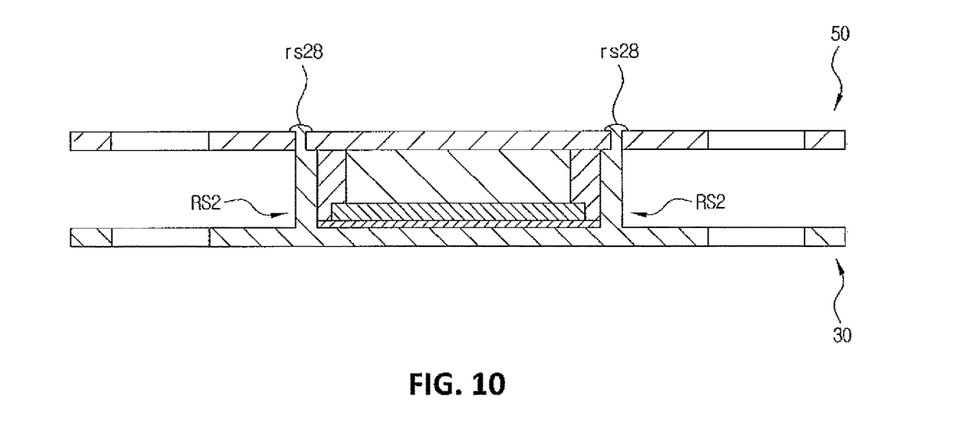
FIG. 10 is a cross-sectional view showing a state after being coupled by a caulking work in FIG. 8.

Next, FIG. 7 is a cross-sectional view showing a state of a second exemplary embodiment according to the present invention before being coupled, FIG. 8 is a cross-sectional view showing a partial state in a coupling process in FIG. 7, and FIG. 9 is a cross-sectional view showing a state after being coupled by pressing and bending in FIG. 8. Meanwhile, FIG. 10 is a cross-sectional view showing a state after being coupled by caulking in FIG. 8. Hereinafter, a second exemplary embodiment will be described with reference to FIGS. 7 to 10, but contents thereof overlapped with a first exemplary embodiment will be omitted.

Referring to FIG. 7, in a second exemplary embodiment of the present invention, the above-mentioned separable rod cover RC1 may be omitted. Instead, the second heat radiating plate 50 is provided with at least one or more fastening grooves 560a and 560b.

Meanwhile, the rod sidewall RS used in a second exemplary embodiment may be a second rod sidewall RS2 that has substantially the same as that of the above-mentioned first rod sidewall RS1, but is different in a length and an assembling method of a second extension tab rs24 from the above-mentioned first rod sidewall RS1.

That is, the second rod sidewall RS2 includes a pair of second sidewalls rs21 spaced apart from each other by a predetermined distance and second extension tabs rs24 extended from the second sidewalls by a predetermined length, respectively, and penetrating through the fastening grooves 560a and 560b of the second heat radiating plate, respectively. The second extension tabs rs24 may have a length enough so that they penetrate through the fastening grooves 560a and 560b of the second heat radiating plate 50, respectively, and then form second modified parts rs26 (See FIG. 9) bent by pressing or caulking parts rs28 (See FIG. 10) modified by a caulking work, respectively.

Preferably, an upper end portion of the second sidewall rs21 is further provided with a second catching jaw rs22 for allowing a lower surface of the second heat radiating plate 50 to be seated thereon in the state in which the lower surface of the second heat radiating plate 50 is spaced apart from the first heat radiating plate 30 by a predetermined distance, thereby allowing the lower surface of the second heat radiating plate 50 to contact the PTC device 120.

Here, a second heat generation region H2 of the second heat radiating plate 50 contacting an upper portion of the heat source part 10 serves as the rod cover RC, which is one surface of the heat source part rod R. In addition, a first heat generation region H1 of the first heat radiating plate 30 contacting a lower portion of the heat source part 10 serves as the rod cover RC, which is one surface of the heat source part rod R. Therefore, an assembling step may be simplified, a weight may be additionally decreased, and the PTC device 120 and the second heat radiating plate 50 direct contact each other, thereby making it possible to further improve heat exchange performance. In the present invention, the rod covers RC configuring the heat source part rod R indicate members supporting an upper surface and/or a lower surface of the heat source part, the number of rod covers RC may be singular or plural, and the rod covers RC may be formed integrally with the heat radiating plate at the time of being manufactured.

FIG. 8 is a cross-sectional view showing that the second extension tabs rs24 configuring the second rod sidewall RS2 penetrate through first and second fastening grooves 560a and 560b of the second heat radiating plate 50, respectively. In this state, the second extension tabs rs24 may be pressed and bent to thereby be coupled, as second modified parts rs26 as shown in FIG. 9, to an upper surface of the second heat radiating plate 50.

Although the case in which the second extension tabs rs24 are bent inward has been shown in FIG. 9, the second extension tabs rs24 may also be bent outward. In addition, the second extension tab rs24 may be formed on both of the upper ends of the second sidewalls rs21 or be formed on any one of the upper ends of the second sidewalls rs21, similar to a first exemplary embodiment. The second heat radiating plate 50 may be provided with fastening grooves 560 corresponding to a cross-sectional shape of the second extension tabs rs24 and the number of second extension tabs rs24.

As another coupling example, FIG. 10 shows a coupled state by a caulking method in a state of FIG. 8. A known method may be adopted as the caulking work, and end portions of the second extension tabs rs24 are pressed, thereby making it possible to form caulking parts rs28 as shown in FIG. 10. Meanwhile, although the case in which the caulking parts rs28 are formed on outer surfaces of the fastening grooves 560a and 560b of the second heat radiating plate 50 has been shown in FIG. 10, the fastening grooves may be formed in a taper shape so as to become wide in an upward direction, and the caulking parts may be formed on the fastening grooves so as to be buried in the fastening grooves at a predetermined depth (not shown).

Meanwhile, in a second exemplary embodiment of the present invention, an example in which the pair of rod sidewalls RS2 are formed on the first radiating plate 30, respectively, and the second extension tabs rs24 extended from the rod sidewall RS2 penetrate through the fastening grooves 560a and 560b of the second heat radiating plate 50, respectively, and are then pressed has been described. However, the present invention is not limited thereto. That is, the first heat radiating plate 30 may be provided with one second rod sidewall RS2 and a first fastening groove, and the second heat radiating plate 50 may be provided with another second rod sidewall RS2 that may be fitted into the first fastening groove and a second coupling groove, wherein another second rod sidewall RS2 and the second coupling groove face the first fastening groove and one second rod sidewall RS2, respectively. However, in this modified example, a cost required for manufacturing the first and second heat radiating plates may be decreased, but an assembling process may be slightly complicated.

Figure 11:
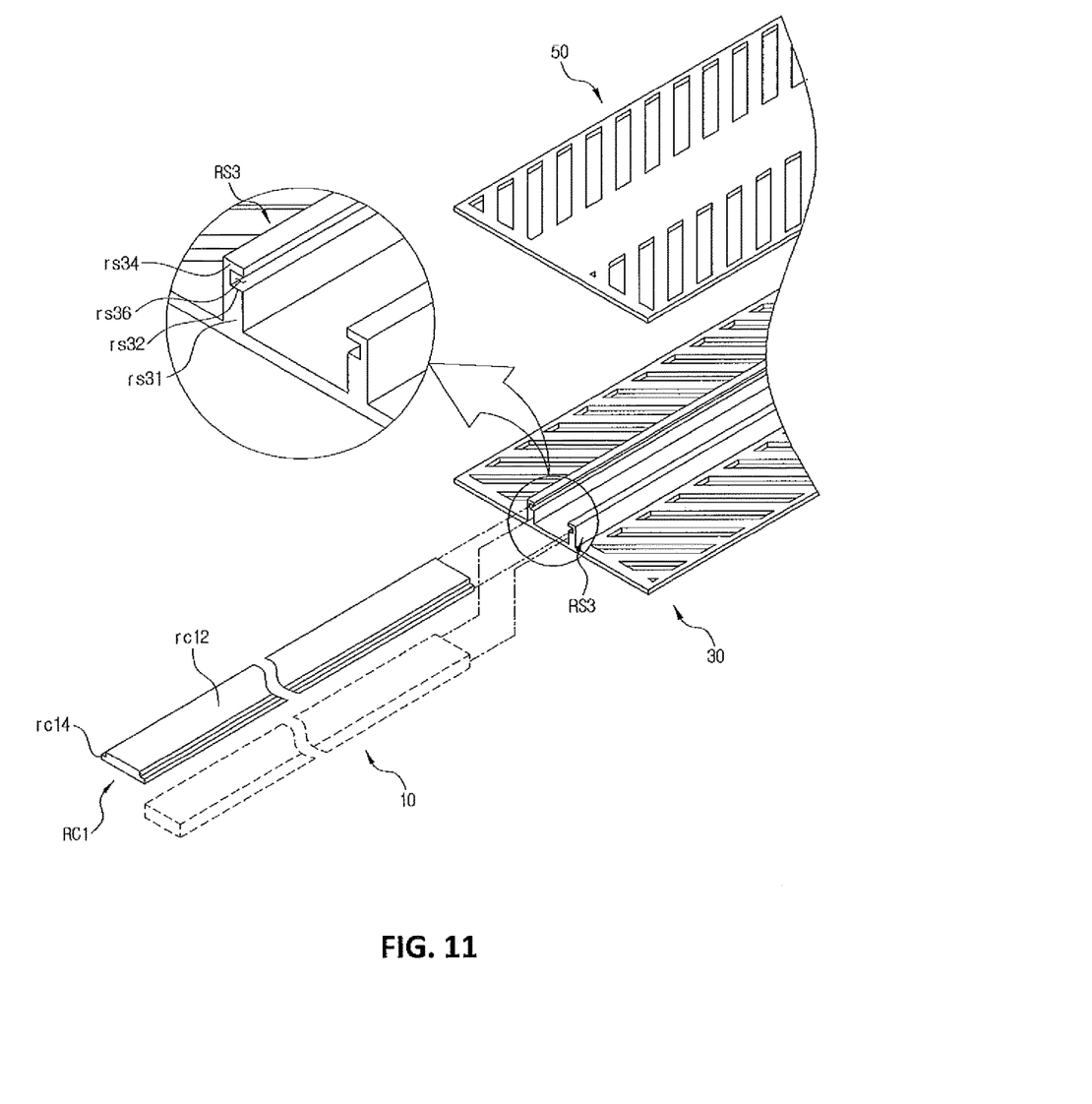
FIG. 11 is an exploded fragmentary perspective view showing a third exemplary embodiment according to the present invention.
Figure 12:
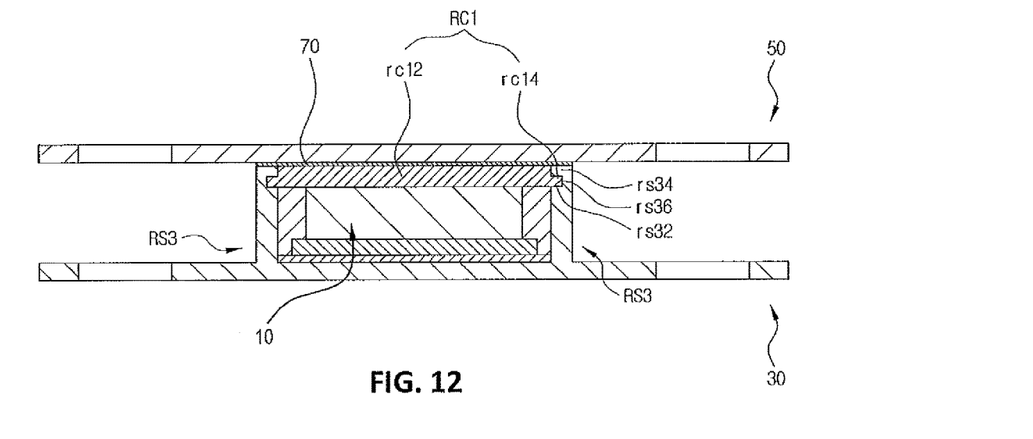
FIG. 12 is a cross-sectional view showing a state of a third exemplary embodiment according to the present invention after being coupled.

Next, FIG. 11 is an exploded perspective view showing a third exemplary embodiment according to the present invention, FIG. 12 is a cross-sectional view showing a state of a third exemplary embodiment according to the present invention after being coupled.

In first and second exemplary embodiments described above, a process in which a step of pressing the extension tabs rs14 and rs24 to bend the extension tabs rs14 and rs24 as the modified parts rs16 and rs26 is performed during assembling has been described. On the other hand, a third exemplary embodiment is characterized in that a third rod sidewall RS3 provided with first guide grooves rs36 into which the separable rod cover RC1 provided with the step parts rc14 may be slid and inserted in a Y axis direction (direction penetrating through a paper of FIG. 12) is formed integrally with the first heat radiating plate 30.

Referring to FIGS. 11 and 12, the third rod sidewall RS3 provided with the first guide grooves rs36 may be extrusion-molded integrally with the first heat radiating plate 30. The third rod sidewall RS3 may include a pair of third sidewalls rs31 and the first guide grooves rs36 formed in inner surfaces of the third sidewalls rs31, respectively, and having the step parts rc14 of the first rod cover RC1 slid and inserted thereinto, respectively. That is, the first guide grooves rs36 may be provided in a partially opened shape between the third sidewalls rs31 and first guide tabs rs34 configuring the third rod sidewalls RS3.

An assembling process will be described with reference to FIGS. 11 and 12. The heat source part 10 is seated in a space between the third sidewalls rs31, and the step parts rc14 of the separable rod cover RC1 are slid and inserted into the first guide grooves rs36 of the third rod sidewall RS3. Then, an adhesive means 70 is interposed between an upper surface of the separable rod cover RC1 and the second heat radiating plate 50 to complete the present invention.

Figure 13:
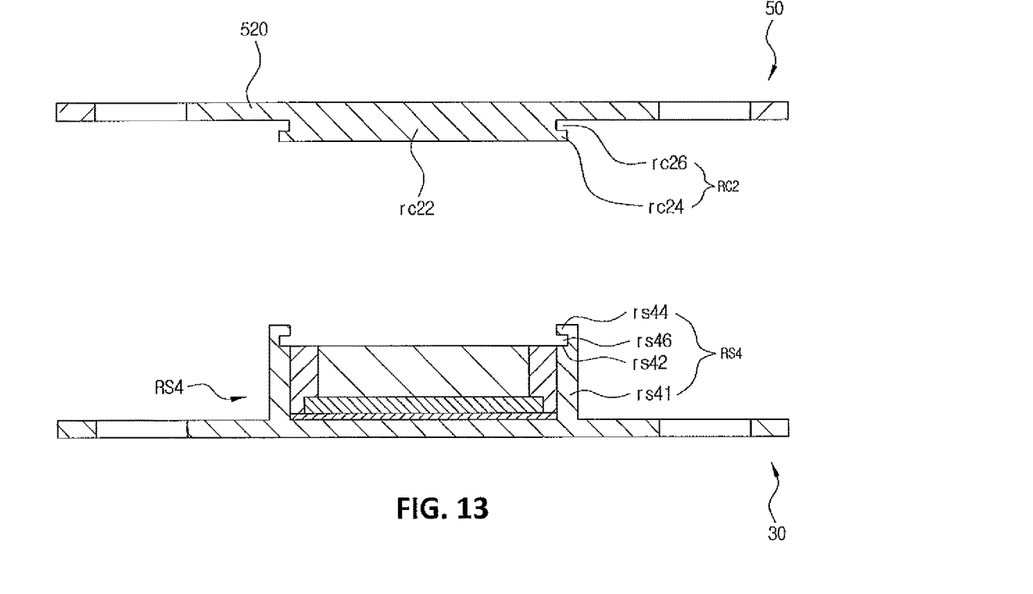
FIG. 13 is a cross-sectional view showing a state of a fourth exemplary embodiment according to the present invention before being coupled.
Figure 14:
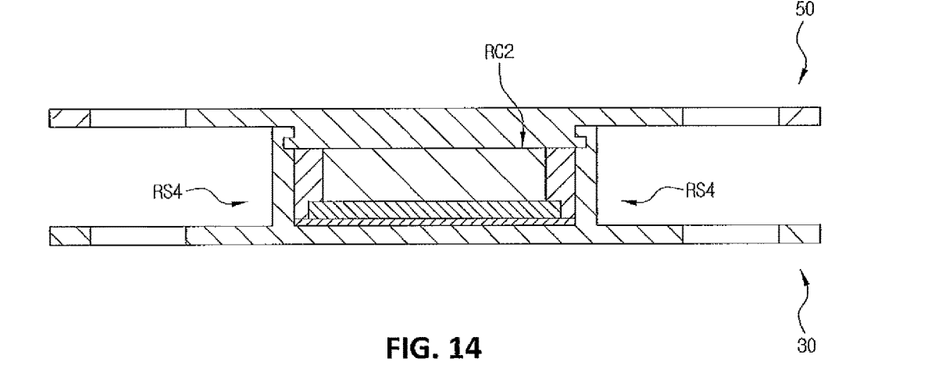
FIG. 14 is a cross-sectional view showing a state after being coupled in FIG. 13.

Next, FIG. 13 is a cross-sectional view showing a state of a fourth exemplary embodiment according to the present invention before being coupled; and FIG. 14 is a cross-sectional view showing a state after being coupled in FIG. 13.

Referring to FIGS. 13 and 14, a fourth exemplary embodiment of the present invention is characterized in that it is an integral rod cover RC2 in which the rod cover RC is formed integrally with the second heat radiating plate 50. As the rod sidewall RS that may be mechanically coupled to the integral rod cover RC2, a fourth rod sidewall RS4 may be provided integrally with the first heat radiating plate 30. More preferably, the fourth rod sidewall RS4 and the first heat radiating plate 30 may be provided integrally with each other by extrusion-molding.

First, the integral rod cover RC2 formed integrally with the second heat radiating plate 50 may include a rod cover body rc22 and third guide tabs rc24 protruding from both end portions of the rod cover body rc22, respectively. The second heat radiating plate 50 and the third guide tabs rc24 have third guide grooves rc26 formed therebetween, respectively.

Meanwhile, the fourth rod sidewall RS4 may include a pair of fourth sidewalls rs41 extended from the first heat radiating plate 30 and spaced apart from each other by a predetermined distance and second guide tabs rs44 vertically bent inward from upper ends of the fourth sidewalls, respectively, in a direction in which the heat source part 10 may be embedded.

Referring to FIG. 14, the second guide tabs rs44 of the fourth rod sidewall RS4 may be engaged with the third guide grooves rc26 of the integral rod cover RC2. More specifically, the fourth rod sidewall RS4 may further include fourth catching jaws rs42 formed in inner surfaces of the fourth sidewalls rs41 and seating both end portions of a lower surface of the rod cover body rc22. The fourth catching jaws rs42 and the second guide tabs rs44 may have fourth guide rails rs46 formed therebetween, respectively, and the fourth catching jaws rs42 may firmly seat both end portions of the integral rod cover RC2.

Meanwhile, FIG. 15 is an assembled perspective view showing another example of an insulating guide member 160' of a heat source part 10' configuring the present invention. Referring to FIG. 15, the insulating guide member 160' capable of maintaining an insulation state between the electrode plate 140 and the heat source part rod R without using the insulating layer 180 shown in FIG. 4 is provided.

More specifically, an upper surface of the insulating guide member 160' is provided with at least one or more opening parts 162 having a shape corresponding to that of the PTC device 120. In addition, the opening part 162 may have a size and a height at which it seats the PTC device 120 therein to allow a lower surface of the PTC device 120 to be closely adhered to an upper surface of the electrode plate 140 and allow an upper surface of the PTC device 120 to be closely adhered to the second heat radiating plate 50.

A side of the insulating guide member 160' is provided with a slit shaped electrode plate receiver 166' having a shape of a hollow part into which the electrode plate 140 may be slid and inserted in a transversal direction as shown in FIG. 15. Here, the slit shaped electrode plate receiver 166' is insulated from the first heat radiating plate 30 by an insulating part 168'.

While the insulating guide member 160 described above as shown in FIG. 4 may require a separate insulating layer 180, the insulating guide member 160' as shown in FIG. 15 is provided integrally with an insulating guide member without the separate insulating layer 180, such that it may be simplified.

As described above, in the heater for a motor vehicle according to the present invention, the rod sidewall RS is formed integrally with the first heat radiating plate 30 to configure the heat source part rod R in which the heat source part 10 is received, unlike the related art. In addition, the heater for a motor vehicle in which the heat source part 10 is provided between the first and second heat radiating plates 30 and 50 is provided.

Therefore, the rod assembly that has been used in the related art may be designed by a simpler structure, and the adhesive means is replaced by mechanical fastening or is used as small as possible, such that close adhesion and fixing of the PTC device, and the like, are maintained. In addition, problems such as generation of a deviation in performance due to application of the adhesive means as well as durability at the time of repetitive thermal load may be provided.

Further, unlike disposition of the PTC device used in the related art, a contact surface between the PTC device and the electrode plate is disposed in parallel with each of the first and second heat radiating plates, such that a thickness direction the PTC device which is the thinnest is put in the air flow direction. Therefore, a heater for a motor vehicle having a compact structure (so-called 'thin film type structure') in which a thickness and a volume thereof are smaller than those of the heater for a motor vehicle according to the related art may be provided.

The present invention is not limited to the above-mentioned exemplary embodiments, and may be variously applied, and may be variously modified without departing from the gist of the present invention claimed in the claims.

The invention claimed is:

1. A heater for a motor vehicle comprising:
a heat source part;
a heat source part rod including a rod sidewall and a rod cover which receives the heat source part;
a first heat radiating plate including a first heat generation region and a first air movement region, the first air movement region having at least one first air through-hole, which has a slit-shape with a line direction, formed therein, the heat source part disposed on a first side of the first heat radiating plate, and the rod sidewall formed integrally with the first heat radiating plate; and
a second heat radiating plate including a second heat generation region and a second air movement region, the second air movement region having at least one second air through-hole formed therein,
wherein the heat source part is disposed between the first heat radiating plate and the second heat radiating plate, and
wherein the second air through-hole, which has a slit shape with a line direction, is disposed so that the line direction of the second air through-hole intersects the line direction of the first air through-hole when viewed in a direction of air movement,
wherein the heat source part includes a positive temperature coefficient device, an electrode plate electrically contacting the positive temperature coefficient device, and an insulating guide member insulating the positive temperature coefficient device and the electrode plate from the rod sidewall,
wherein the insulating guide member is formed in a tube shape with a slit-shaped electrode plate receiver into which the electrode plate is inserted, the slit-shaped electrode plate receiver is a hollow inner space of the insulating guide member, and wherein the insulating guide member has an opening part penetrating through surfaces of the tube shape, wherein the slit-shaped electrode plate receiver communicates with the opening part, and the positive temperature coefficient device is inserted into the opening part, wherein the positive temperature coefficient device is electrically contacting the electrode plate.

2. The heater for a motor vehicle of claim 1, wherein the rod sidewall is extrusion-molded integrally with the first heat radiating plate.

3. The heater for a motor vehicle of claim 1, wherein the positive temperature coefficient device and the electrode plate are sequentially stacked in an axial direction, and wherein the first heat radiating plate, the heat source part, and the second heat radiating plate are coupled to each other in the axial direction.

4. The heater for a motor vehicle of claim 3, wherein the rod cover includes a first rod cover provided with step parts and the rod sidewall includes a pair of sidewalls spaced apart from each other by a predetermined distance, wherein a catching jaw is formed at an upper end portion of each of the sidewalls, wherein the step parts of the rod cover are seated on the catching jaw, and wherein modified parts extend from the catching jaws and are pressed to upper surfaces of the step parts.

5. The heater for a motor vehicle of claim 4, wherein the rod cover and the second heat radiating plate are coupled to each other by an adhesive.

* * * * *